UNITED STATES PATENT OFFICE.

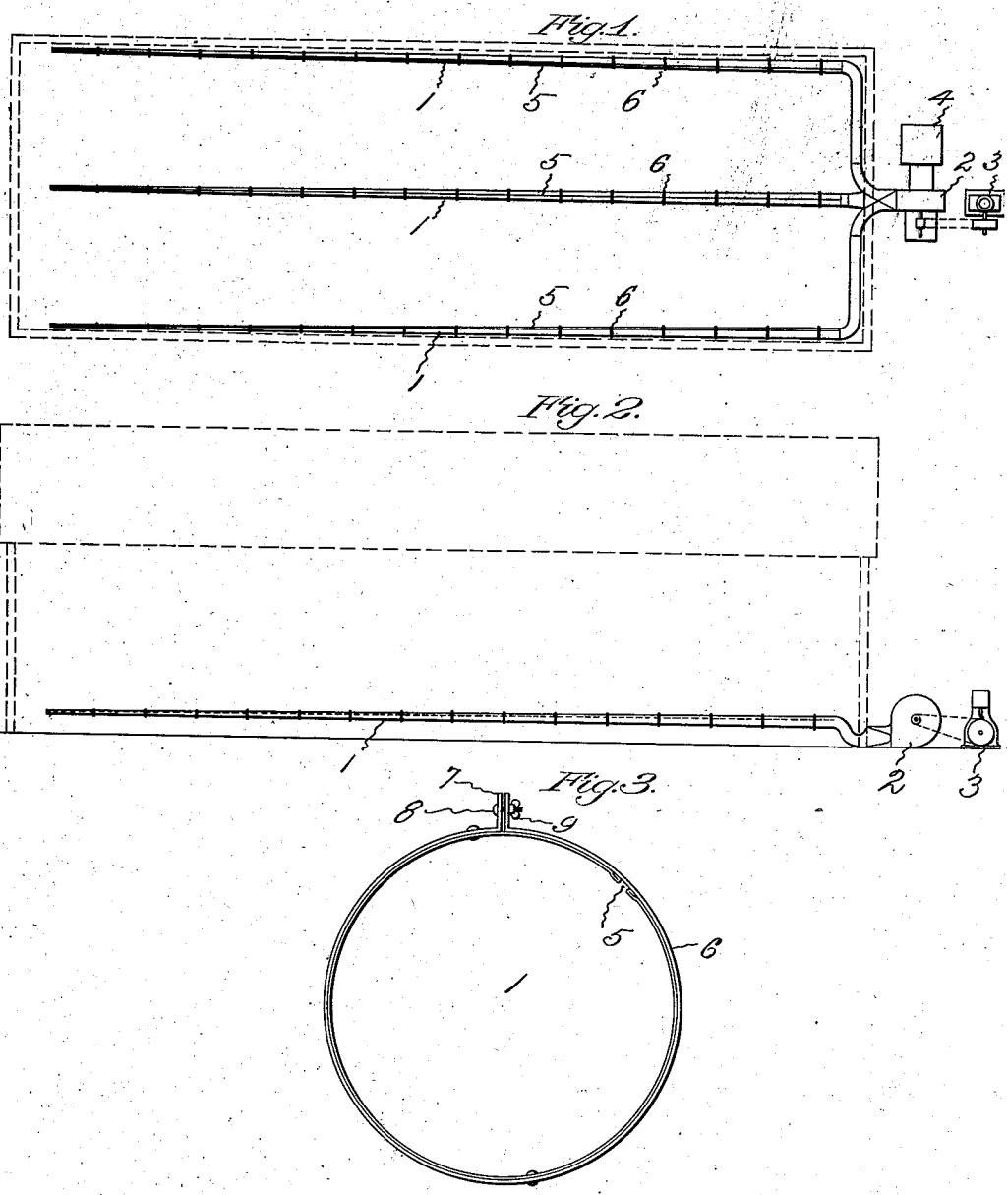

CHARLES H. KEENEY, OF HARTFORD, CONNECTICUT.

TOBACCO-CURING APPARATUS.

No. 815,093.

Specification of Letters Patent.

Patented March 13, 1906.

Application filed November 8, 1905. Serial No. 286,371.

*To all whom it may concern:*

Be it known that I, CHARLES H. KEENEY, a citizen of the United States, residing at Hartford, in the county of Hartford and State of Connecticut, have invented a new and useful Tobacco-Curing Apparatus, of which the following is a specification.

Tobacco after being cut is hung in sheds for curing. During the process of curing under certain atmospheric conditions what is known as "pole-sweat" is likely to occur and ruin the leaves. This invention relates to an apparatus which is designed to prevent pole-sweat.

The object of the invention is to provide a simple apparatus which can be cheaply installed in a shed and readily operated by comparatively inexperienced persons, which insures such a circulation of air in the shed that the tobacco-leaves will be uniformly cured and pole-sweat prevented.

The apparatus that is shown in the drawings as embodying the invention has a number of tapering tubes that extend the length of the shed near the floor, with slots extending the entire lengths of the tubes, a motor and blower for forcing air into the tubes and causing it to flow out through the slots in thin sheets, and a heater for controlling the temperature of the air that is forced into the tubes.

Figure 1 of the accompanying drawings shows a plan of this apparatus in a tobacco-shed. Fig. 2 shows a side elevation of the same; and Fig. 3 shows, on much larger scale, a cross-sectional view of one of the tubes.

The tubes 1 are preferably formed of suitably-riveted sections of galvanized iron, and they are desirably located in the lower part of the shed near each side and through the middle. If desired, of course the tubes can be arranged near each side of the shed or only down through the middle. These tubes taper from one end to the other, the larger ends having sufficient area to equalize the air-pressure throughout the lengths of the tubes. The larger ends of the tubes of the form of apparatus shown are joined near the center at one end of the shed and are connected with the outlet of a blower 2. This blower is driven by a motor 3, which may be a gasolene or other common form of engine. If desired, the inlet of the blower may be connected with a heater 4, so that the air which is taken into the blower and forced into the tubes will be warmed. Extending longitudinally the entire length of each tube is a slot 5. These slots may be arranged so that air will blow out at forty-five degrees, or vertically, or at any other desired angle. In order to hold the slotted tubes together, they are encircled at intervals by bands 6, which are provided with lugs 7, that are held together by bolts 8, provided with thumb-nuts 9. By adjusting the thumb-nuts on the bolts and tightening or loosening the bands the width of the slots may be regulated.

With this simple apparatus, which will not get out of order and can be operated by any one, thin sheets of air of equal pressure and the required temperature are projected upwardly between the leaves of the tobacco the entire length of the shed, so as to cure the leaves uniformly and prevent the collection of dampness which will produce pole-sweat.

The invention claimed is—

1. A tobacco-curing apparatus having a tapering tube with a slot extending on the upper side from end to end of the tube, a blower with its discharge connected with the large end of the pipe, and a motor for operating the blower, substantially as specified.

2. A tobacco-curing apparatus having a tapering tube with a slot extending from end to end on its upper side, a blower with its discharge connected with the large end of the pipe, a motor for operating the blower, and a heater connected with the inlet of the blower, substantially as specified.

3. A tobacco-curing apparatus having a tapering tube with a slot extending from end to end on the upper side of the tube, bands encircling and holding the tube together at intervals along its length, a blower with its discharge connected with the large end of the tube, and a motor for operating the blower, substantially as specified.

CHARLES H. KEENEY.

Witnesses:
ETHEL M. LOWE,
HARRY R. WILLIAMS.